(12) United States Patent
Yang et al.

(10) Patent No.: US 9,190,051 B2
(45) Date of Patent: Nov. 17, 2015

(54) CHINESE SPEECH RECOGNITION SYSTEM AND METHOD

(75) Inventors: Jyh-Her Yang, Taoyuan County (TW); Chen-Yu Chiang, Hsinchu County (TW); Ming-Chieh Liu, Taoyuan County (TW); Yih-Ru Wang, Hsinchu (TW); Yuan-Fu Liao, Hsinchu (TW); Sin-Horng Chen, Hsinchu County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 888 days.

(21) Appl. No.: 13/446,663

(22) Filed: Apr. 13, 2012

(65) Prior Publication Data

US 2012/0290302 A1 Nov. 15, 2012

(30) Foreign Application Priority Data

May 10, 2011 (TW) .............................. 100116350 A
Nov. 18, 2011 (TW) .............................. 100142341 A

(51) Int. Cl.
G10L 15/00 (2013.01)
G10L 17/00 (2013.01)
G10L 15/04 (2013.01)
(Continued)

(52) U.S. Cl.
CPC ............... *G10L 15/08* (2013.01); *G10L 15/063* (2013.01); *G10L 15/1807* (2013.01)

(58) Field of Classification Search
USPC ............................................................ 704/9
See application file for complete search history.

(56) References Cited

U.S. PATENT DOCUMENTS 6,978,239 B2 * 12/2005 Chu ........................ G10L 13/07
 704/258
7,263,488 B2 * 8/2007 Chu et al. ...................... 704/251
(Continued)

FOREIGN PATENT DOCUMENTS

TW 325556 1/1998
TW 508564 B 11/2002
(Continued)

OTHER PUBLICATIONS

Ananthakrishnan et al, "Improved Speech Recognition using Acoustic and Lexical Correlates of Pitch Accent in a N-Best Rescoring Framework," Apr. 2007, In Acoustics, Speech and Signal Processing, 2007. ICASSP 2007. IEEE International Conference on , vol. 4, no., pp. IV-873-IV-876.*
(Continued)

*Primary Examiner* — Olujimi Adesanya
(74) *Attorney, Agent, or Firm* — Muncy, Geissler, Olds & Lowe, P.C.

(57) ABSTRACT

A Chinese speech recognition system and method is disclosed. Firstly, a speech signal is received and recognized to output a word lattice. Next, the word lattice is received, and word arcs of the word lattice are rescored and reranked with a prosodic break model, a prosodic state model, a syllable prosodic-acoustic model, a syllable-juncture prosodic-acoustic model and a factored language model, so as to output a language tag, a prosodic tag and a phonetic segmentation tag, which correspond to the speech signal. The present invention performs rescoring in a two-stage way to promote the recognition rate of basic speech information and labels the language tag, prosodic tag and phonetic segmentation tag to provide the prosodic structure and language information for the rear-stage voice conversion and voice synthesis.

24 Claims, 8 Drawing Sheets

(51) Int. Cl.
*G10L 15/14* (2006.01)
*G10L 15/28* (2013.01)
*G10L 15/08* (2006.01)
*G10L 15/06* (2013.01)
*G10L 15/18* (2013.01)

(56) References Cited

U.S. PATENT DOCUMENTS

| | | | |
|---|---|---|---|
| 7,409,346 | B2 | 8/2008 | Acero et al. |
| 7,747,437 | B2 | 6/2010 | Verhasselt et al. |
| 7,761,296 | B1 | 7/2010 | Bakis et al. |
| 8,374,873 | B2 * | 2/2013 | Stephens, Jr. ........... G10L 13/10 704/231 |
| 2005/0182625 | A1 * | 8/2005 | Azara et al. ................... 704/236 |
| 2005/0256713 | A1 * | 11/2005 | Garg et al. .................... 704/256 |
| 2011/0046958 | A1 * | 2/2011 | Liu et al. ........................ 704/268 |

FOREIGN PATENT DOCUMENTS

| TW | I319152 B | 1/2010 |
|---|---|---|
| TW | I319563 B | 1/2010 |

OTHER PUBLICATIONS

Lin et al, "Spontaneous Mandarin Speech Recognition with Disfluencies Detected by Latent Prosodic Modeling (LPM)", 2006, In Proceedings of International Symposium on Linguistic Patterns in Spontaneous Speech (LPSS 2006), pp. 159-173.*

Liu et al "An Implementation of Prosody-Assisted Mandarin Speech Recognition System", Jul. 2011, Thesis, Institute of Communication Engineering College of Electrical and Computer Engineering National Chiao Tung University, pp. 1-82.*

Chiang et al "Unsupervised joint prosody labeling and modeling for Mandarin speech", Feb. 2009, In Acoust. Soc. Am. 125 (2), pp. 1164-1183.*

Chang et al "Enriching Mandarin Speech Recognition by Incorporating a Hierarchical Prosody Model", Aug. 2011, Thesis, Institute of Communication Engineering College of Electrical and Computer Engineering National Chiao Tung University, pp. 1-63.*

Sankaranarayanan Ananthakrishnan et al., Unsupervised Adaptation of Categorical Prosody Models for Prosody Labeling and Speech Recognition, IEEE Trans. on Audio, Speech, and Language Processing, Jan. 2009, pp. 138-149, vol. 17, No. 1.

Dimitra Vergyri et al., Prosodic Knowledge Sources for Automatic Speech Recognition, Proc. ICASSP, 2003, pp. I208-I211.

Mari Ostendorf et al., Prosody Models for Conversational Speech Recognition, Proc. $2^{nd}$ Plenary Meeting Symp. Prosody and Speech Process, 2003, pp. 147-154.

Xin Lei et al., World-Level Tone Modeling for Mandarin Speech Recognition, Proc. ICASSP, 2007, pp. IV-665-IV-668.

Chongjia NI, Improved Large Vocabulary Mandarin Speech Recognition Using Prosodic and Lexical Information in Maximum Entropy Framework, Proc. CCPR, 2009, pp. 1-4.

Yang Liu, Enriching Speech Recognition with Automatic Detection of Sentence Boundaries and Disfluencies, IEEE Trans. on Audio, Speech, and Language Processing, Sep. 2006, pp. 1526-1540, vol. 14, No. 5.

* cited by examiner

CHINESE SPEECH RECOGNITION SYSTEM AND METHOD

BACKGROUND OF THE INVENTION

1. Field of the Invention

The present invention relates to a speech recognition technology, particularly to a Chinese speech recognition system and method.

2. Description of the Related Art

The prosody-aided speech recognition technology has been an important subject in recent years. Prosody is the suprasegmental features of continuous voices, including accents, tones, pauses, intonations, rhythms, etc. Prosody is physically expressed by the track of pitches, intensities of energy, durations of voices, and pauses of speech. Prosody closely correlates with various levels of linguistic parameters, including phone, syllable, word, phrase, sentence, and even linguistic parameters of higher levels. Therefore, prosody is useful for promoting speech recognition accuracy.

Refer to FIG. 1 a block diagram schematically showing a prosodic model generator concluded from the prior arts of prosody-aided speech recognition technologies. The prosodic model generator includes a prosodic model trainer 10, a parameter extractor 12 and an artificially-labeled prosodic corpus 14. The artificially-labeled prosodic corpus 14 receives speech data, and specialists label the prosodies thereof. From the artificially-labeled prosodic corpus 14, the parameter extractor 12 extracts spectral parameters, linguistic parameters of various levels, and prosodic-acoustic parameters. According to the parameters output by the parameter extractor 12, and the prosodic clues and events found in the artificially-labeled prosodic corpus 14 (such as the pitch accents and the boundaries of intonational phrases), the prosodic model trainer 10 establishes a prosody-dependent acoustic model, a prosody-dependent linguistic model, and a prosodic model to describe the relationships between the prosodic clues of different-level linguistic parameters and the prosodic acoustic parameters thereof.

The abovementioned prior arts can only utilize few obvious prosodic clues because they lack a large-scale corpus having abundant reliable and diversified prosodic tags. Therefore, the conventional technologies can only improve the efficiency of speech recognition to a very limited extent.

Accordingly, the present invention proposes a Chinese speech recognition system and method to overcome the abovementioned problems.

SUMMARY OF THE INVENTION

The primary objective of the present invention is to provide a Chinese speech recognition system and method, wherein a prosodic state model, a prosodic break model, a syllable prosodic model, and a syllable juncture model are used to improve the problems of word recognition errors and tone recognition errors and promote the recognition rates of words, characters, base-syllables of Chinese speech, and wherein part of speech (POS), punctuation marks (PM), prosodic breaks, and prosodic states of Chinese speech files are tagged to provide prosodic structures and linguistic information for the rear-stage voice conversion and voice synthesis.

To achieve the abovementioned objective, the present invention proposes a Chinese speech recognition system, which comprises a language model storage device storing a factored language model; a hierarchical prosodic model comprising a prosodic break (sub-)model, a prosodic state (sub-)model, a syllable prosodic-acoustic (sub-)model and a syllable juncture prosodic-acoustic (sub-)model; a speech recognition device; and a rescorer. The speech recognition device receives a speech signal, recognizes the speech signal and outputs a word lattice. The language model storage device, the hierarchical prosodic model generator and the speech recognition device are connected with the rescorer. The rescorer receives the word lattice, uses the prosodic break model, prosodic state model, syllable prosodic-acoustic model, syllable juncture prosodic-acoustic model and factored language model to rescore and rerank word arcs of the word lattice, and outputs a language tag, a prosodic tag and a phonetic segmentation tag.

The present invention also proposes a Chinese speech recognition method, which comprises steps: receiving a speech signal, recognizing the speech signal and outputting a word lattice; and receiving the word lattice, rescoring word arcs of the word lattice according to a prosodic break model, a prosodic state model, a syllable prosodic-acoustic model, a syllable juncture prosodic-acoustic model and a factored language model, reranking the word arcs, and outputting a language tag, a prosodic tag and a phonetic segmentation tag.

Below, the embodiments are described in detail in cooperation with the drawings to make easily understood the technical contents and accomplishments of the present invention.

DETAILED DESCRIPTION OF THE INVENTION

In one embodiment, Equation (1) is decoded to obtain an optimal language tag $\Lambda_l=\{W, POS, PM\}$, an optimal prosodic tag $\Lambda_p=\{B, P\}$ and an optimal phonetic segmentation tag $\gamma_s$.

$$\Lambda_l^*, \Lambda_p^*, \Upsilon_s^* = \arg\max_{\Lambda_l,\Lambda_p,\Upsilon_S} P(W, POS, PM, B, P, \Upsilon_s \mid Xa, Xp) \approx \quad (1)$$

$$\arg\max_{\Lambda_l,\Lambda_p,\Upsilon_S} \{P(Xa, \Upsilon_S \mid W)P(W, POS, PM) \cdot P(B \mid \Lambda_l)$$

$$P(P \mid B)P(X \mid \Upsilon_s, \Lambda_p, \Lambda_l)P(Y, Z \mid \Upsilon_s, \Lambda_p, \Lambda_l)\}$$

wherein $P(B|\Lambda_l)$, $P(P|B)$, $P(X|\gamma_s,\Lambda_p,\Lambda_l)$ and $P(Y, Z|\gamma_s,\Lambda_p, \Lambda_l)$ are respectively a prosodic break model, a prosodic state model, a syllable prosodic-acoustic model, and a syllable juncture prosodic-acoustic model, and wherein $W=\{w_1^M\}=\{w_1 \ldots w_M\}$ is a word sequence, $POS=\{pos_1^M\}=\{pos_1 \ldots pos_M\}$ a part of speech (POS) sequence associated with W, and $PM=\{pm_1^M\}=\{pm_1 \ldots pm_M\}$ a punctuation marks (PM) sequence, and wherein M is the quantity of all the words of the speech signal, and wherein $B=\{B_1^N\}=\{B_1 \ldots B_N\}$ is a prosodic break sequence, and $P=\{p,q,r\}$ with $p=\{p_1^N\}$, $q=\{q_1^N\}$, and $r=\{r_1^N\}$ representing prosodic state sequence for syllable pitch level, duration, and energy level, respectively; N is the quantity of all the syllables of the speech signal, and wherein $Xp=\{X,Y,Z\}$ is a prosodic acoustic parameter sequence, and wherein X is a syllable prosodic-acoustic parameter, Y a syllable juncture prosodic-acoustic parameter, and Z a syllable juncture difference parameter.

Figure 1:
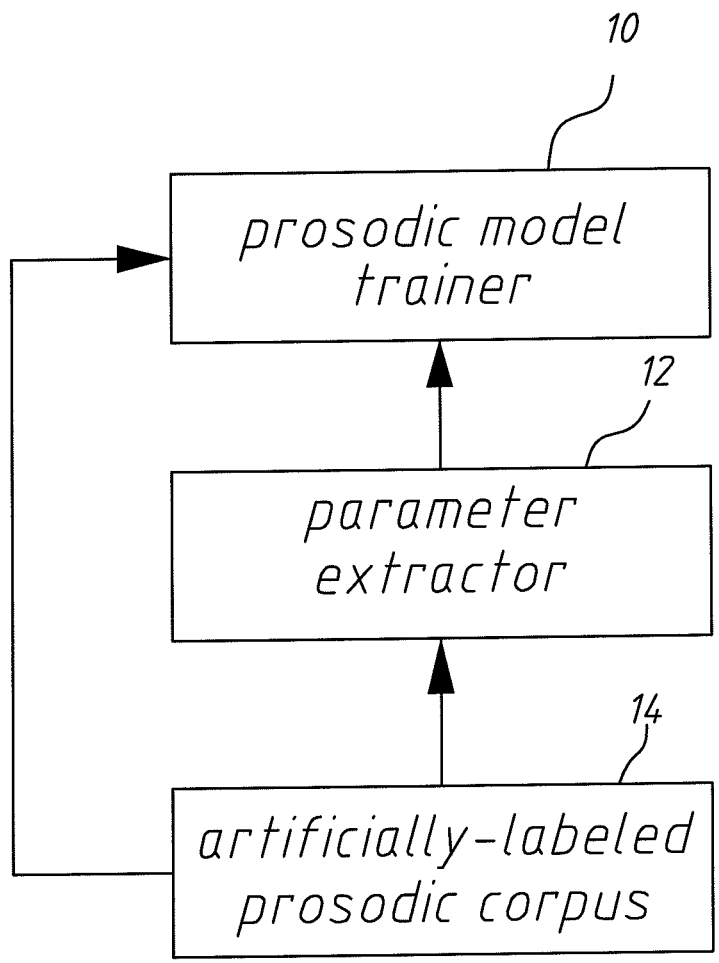
FIG. 1 is a block diagram schematically showing a conventional prosodic model generation process.
Figure 2:
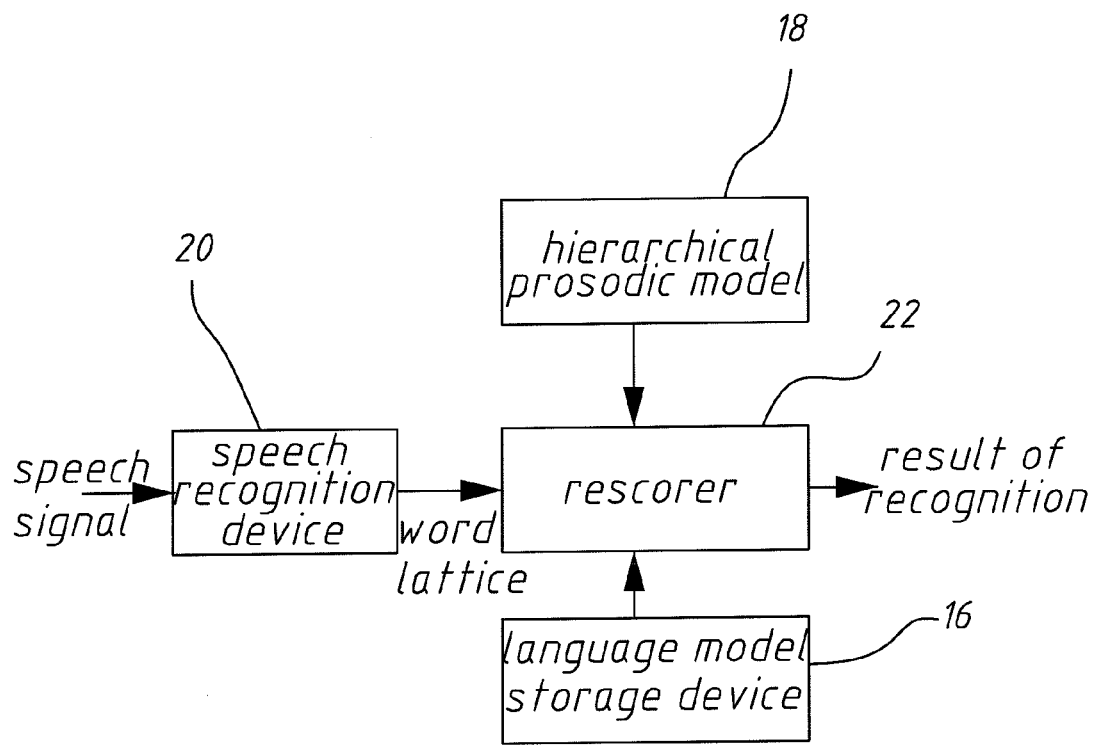
FIG. 2 is a block diagram schematically showing a Chinese speech recognition system according to one embodiment of the present invention.

Refer to FIG. 2. The Chinese speech recognition system of the present invention comprises a language model storage device 16, a hierarchical prosodic model 18, a speech recognition device 20 and a rescorer 22. The language model storage device 16 contains a plurality of language models. The language model includes a factored language model, which simulates W, POS and PM to provide different levels of language parameters for predicting prosodic models. The hierarchical prosodic model 18 comprises a plurality of prosodic sub-models, including the abovementioned prosodic break model, prosodic state model, syllable prosodic-acoustic model and syllable juncture prosodic-acoustic model, which can improve the problems of word recognition errors and tone recognition errors. The speech recognition device 20 receives a speech signal. The speech recognition device 20 contains an acoustic model and a bigram language model, uses the acoustic model and bigram language model to recognize the speech signal, and outputs a word lattice. The language model storage device 16, hierarchical prosodic model generator 18 and speech recognition device 20 are connected with the rescorer 22. The rescorer 22 receives the word lattice, uses the acoustic model, prosodic break model, prosodic state model, syllable prosodic-acoustic model, syllable juncture prosodic-acoustic model, factored language model and Equation (2) to rescore and rerank word arcs of the word lattice, and outputs the language tag $\Lambda_l$, prosodic tag $\Lambda_p$ and phonetic segmentation tag $\gamma_s$ corresponding to the speech signal. Thereby are not only promoted the recognition rates of words, characters and base-syllables of Chinese speech but also tagged the POS, PM, prosodic breaks and prosodic states, which can provide the prosodic structure and language information for the rear-stage voice conversion and voice synthesis.

$$L(S, \Lambda_a) = \sum_{j=1}^{16} \alpha_j \log p_j \qquad (2)$$

wherein $S=[s_1 \ldots s_{16}]$ is a 16-dimensional vector formed by these sixteen probabilities, and wherein $\Lambda_a=[\alpha_1 \ldots \alpha_{16}]$ is a weighting vector determined by a discriminative model combination algorithm.

Figure 3:
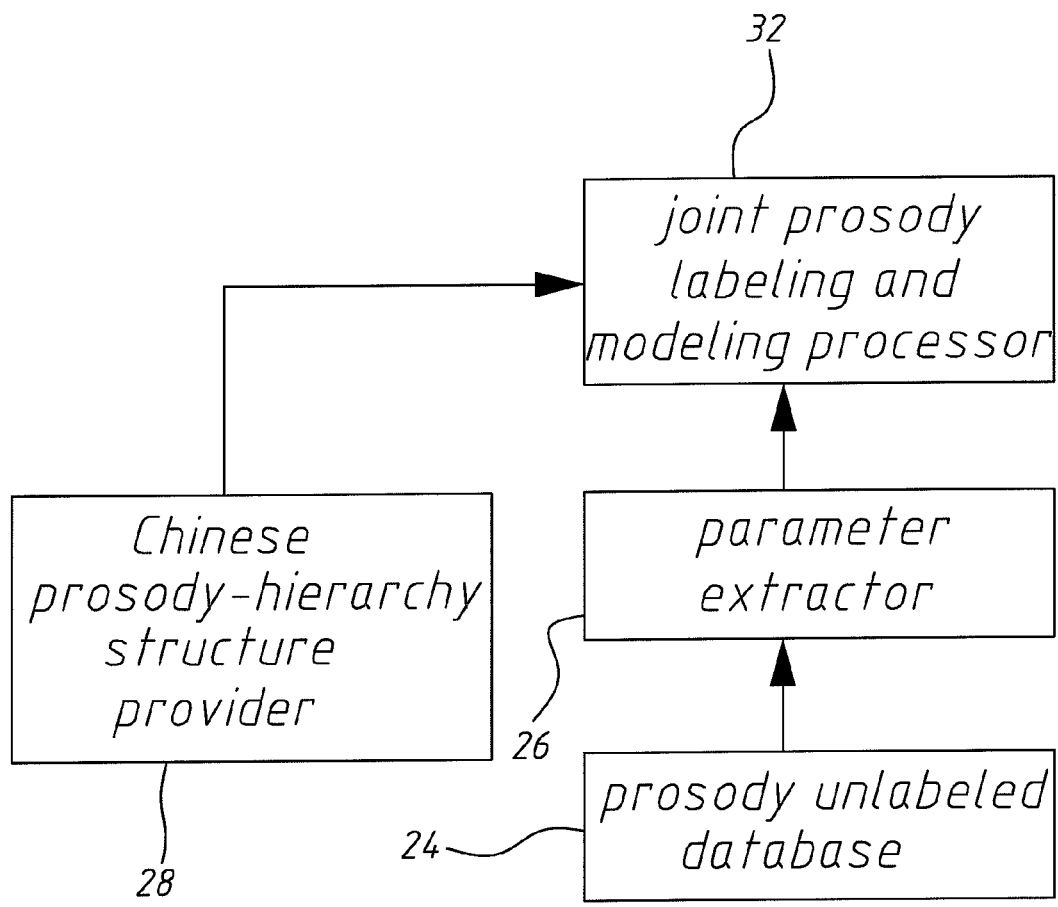
FIG. 3 is a block diagram schematically showing a hierarchical prosodic model according to one embodiment of the present invention.
Figure 4:
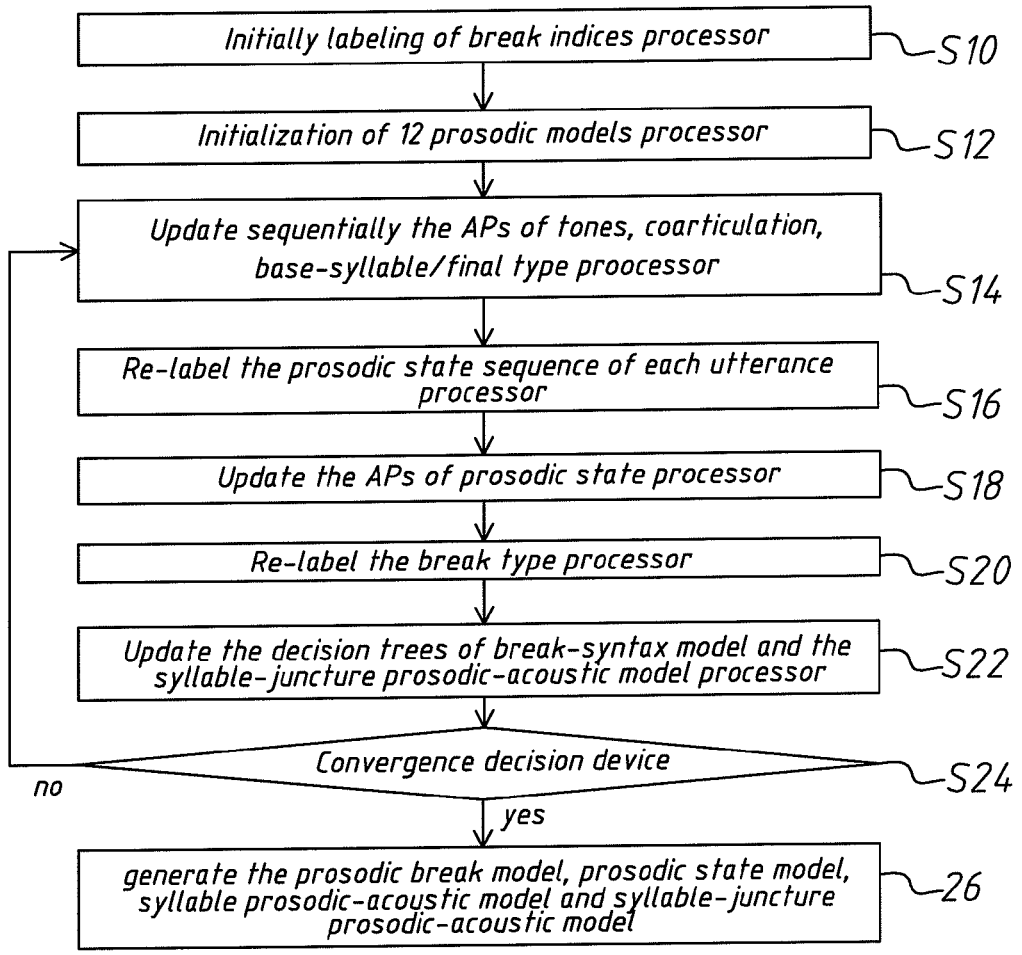
FIG. 4 is a flowchart of a sequential optimization algorithm according to one embodiment of the present invention.
Figure 5:
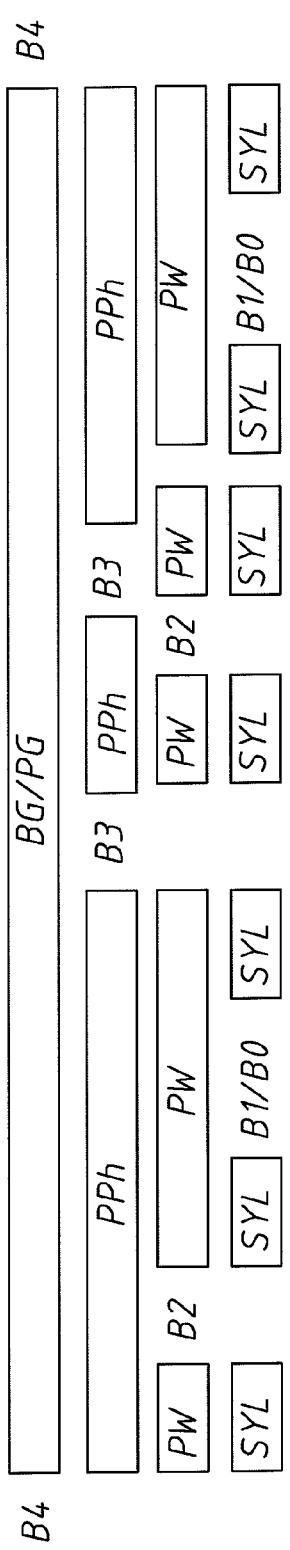
FIG. 5 is a diagram schematically showing prosodic components and prosodic break tags according to one embodiment of the present invention.
Figure 6:
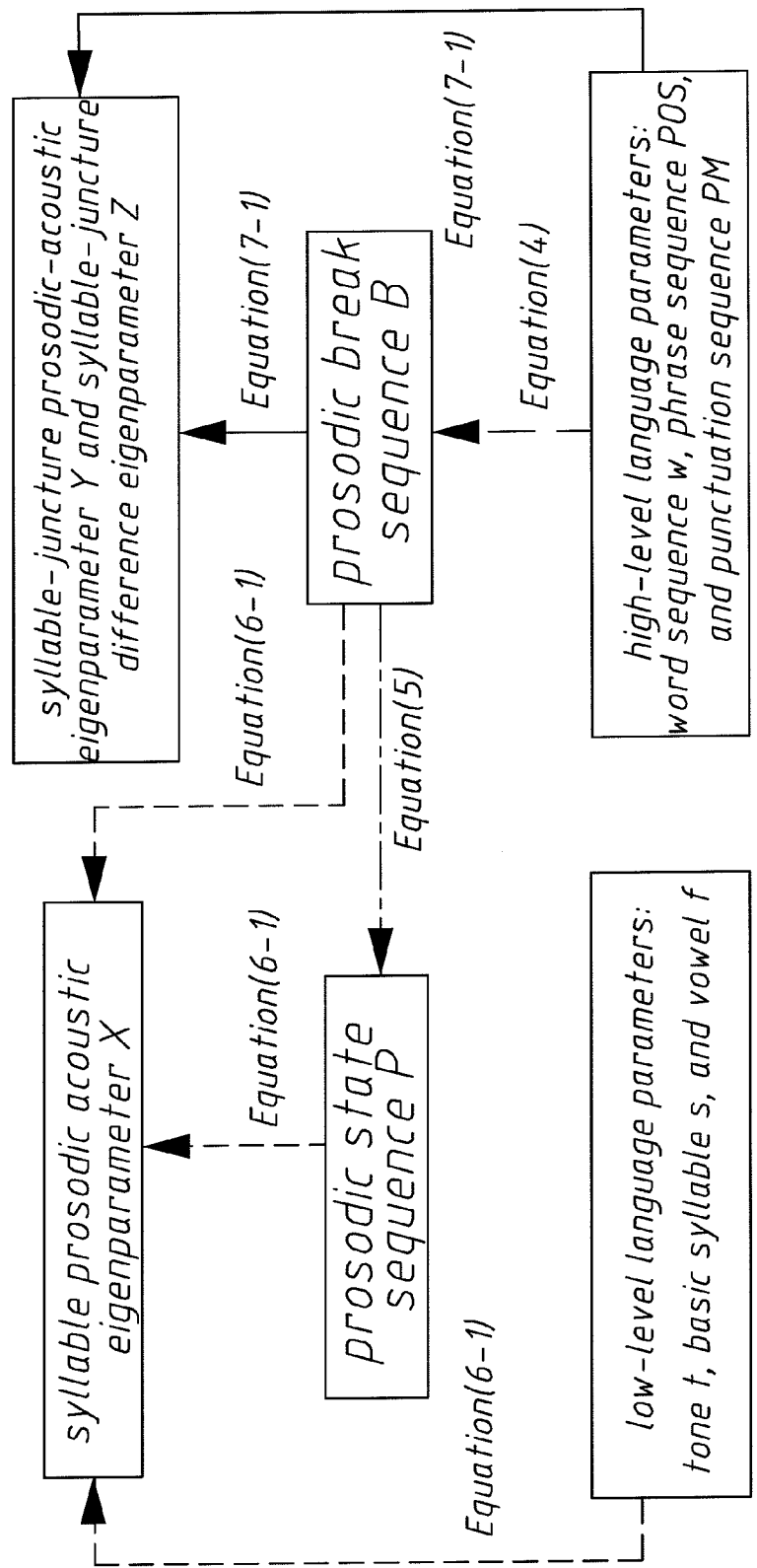
FIG. 6 is a diagram schematically showing the relationships of a prosodic break model, a prosodic state model, a syllable prosodic-acoustic model, a syllable juncture prosodic-acoustic model, and language parameters according to one embodiment of the present invention.

Refer to FIG. 3 and FIG. 4. The hierarchical prosodic model 18 further comprises a prosody unlabeled database 24, a parameter extractor 26, a Chinese prosody-hierarchy structure provider 28, and a joint prosody labeling and modeling processor 32 that includes a step S10 of initially labeling of break indices processor, a step S12 of initialization of 12 prosodic models processor, a step S14 of sequentially updating the affecting factors (APs) of tone, coarticulation, base-syllable/final type processor, a step S16 of re-labeling the prosodic state sequence of each utterance processor, a step S18 of updating the APs of prosodic state processor, a step S20 of re-labeling the break type processor, a step S22 of updating the decision trees of break-syntax model and the syllable juncture prosodic-acoustic model processor, and a step S24 of the convergence decision device. The prosody unlabeled database 24 is connected with the parameter extractor 26. According to a speech file and the text thereof stored in the prosody unlabeled database 24, the parameter extractor 26 extracts and outputs a plurality of low-level language parameters, a plurality of high-level language parameters, and a plurality of prosodic-acoustic parameters respectively related to the pitch contour, the syllable duration, and the energy contour of a speech signal. The low-level language parameters include tones t, base-syllables s and final type of syllable f. The high-level language parameters include W, POS, and PM. The Chinese prosody-hierarchy structure provider 28 provides a plurality of prosodic components and a plurality of prosodic break tags. Each prosodic break tag is used to identify one prosodic component. In one embodiment, there are four types of prosodic break tags, including a first-type prosodic break tag B0/B1, a second-type prosodic break tag B2, a third-type prosodic break tag B3 and a fourth-type prosodic break tag B4, as shown in FIG. 5. The prosodic components include syllable SYL, prosodic word PW, prosodic phrase PPh, and breath group BG/prosodic phrase group PG. The parameter extractor 26 and the Chinese prosody-hierarchy structure provider 28 are connected with the joint prosody labeling and modeling processor 32. From the parameter extractor 26 and Chinese prosody-hierarchy structure provider 28, the joint prosody labeling and modeling processor 32 acquires low-level language parameters, high-level language parameters, and prosodic-acoustic parameters to label a prosodic state sequence P and a prosodic break sequence B and to train the prosodic break model, prosodic state model, syllable prosodic-acoustic model and syllable juncture prosodic-acoustic model based on a maximum likelihood criterion. In the following, the sequential optimization algorithm is described in more detail.

S10: Initially labeling of break indices processor. The decision tree is used for initial break type labeling.

S12: Initialization of 12 prosodic models processor.

S14: Update sequentially the affecting factors (APs) of tones, coarticulation, base-syllable/final type processor with all other APs being fixed.

S16: Re-label the prosodic state sequence of each utterance processor.

S18: Update the APs of prosodic state processor with all other APs being fixed.

S20: Re-label the break type processor.

S22: Update the decision trees of break-syntax model and the syllable juncture prosodic-acoustic model processor.

S24: The convergence decision device, repeats the Steps S14-S22 until a convergence is reached. As shown in Step S26, when the convergence is reached, the prosodic break model, prosodic state model, syllable prosodic-acoustic model and syllable juncture prosodic-acoustic model are generated.

The joint prosody labeling and modeling processor 32 automatically labels the prosodic state sequence P and prosodic break sequence B on the speech signal. It is time- and cost-efficient for the present invention to use the large-scale prosodic-tag-free prosody unlabeled database 24 to undertake prosodic tagging and establish prosodic models.

Below are introduced the abovementioned models. The factored language model is expressed by Equation (3):

$$P(W, PM, POS) = \prod_{i=1}^{M} \{P(w_i | w_{i-2}^{i-1}) \cdot P(pos_i | pos_{i-1}, w_i) \cdot P(pm_{i-1} | pos_{i-1}^{i}, w_{i-1})\} \quad (3)$$

wherein $w_i$ is the ith word, $pos_i$ the ith POS tag, and $pm_i$ the ith PM tag.

The prosodic break model is expressed by Equation (4):

$$P(B | \Lambda_l) = \prod_{n=1}^{N-1} P(B_n | \Lambda_{l,n}) \quad (4)$$

wherein $\Lambda_{l,n}$ is the contextual linguistic parameter surrounding syllable n.

The prosodic state model is expressed by Equation (5):

$$P(P | B) = P(p | B)P(q | B)P(r | B) = P(p_1)P(q_1) \quad (5)$$
$$P(r_1)\left[\prod_{n=2}^{N} P(p_n | p_{n-1}, B_{n-1})P(q_n | q_{n-1}, B_{n-1})P(r_n | r_{n-1}, B_{n-1})\right]$$

wherein $p_n$, $q_n$ and $r_n$ are respectively the prosodic states of pitch level, duration and energy level of the nth syllable.

The syllable prosodic-acoustic model is expressed by Equation (6-1):

$$P(X | \Upsilon_s, \Lambda_p, \Lambda_l) = \quad (6-1)$$
$$P(sp | \Upsilon_s, B, p, t)P(sd | \Upsilon_s, B, q, t, s)P(se | \Upsilon_s, B, r, t, f) =$$
$$\prod_{n=1}^{N} P(sp_n | p_n, B_{n-1}^n, t_{n-1}^{n+1})P(sd_n | q_n, s_n, t_n)P(se_n | r_n, f_n, t_n)$$

wherein $sp_n$, $sd_n$, $se_n$, $t_n$, $s_n$, $f_n$ are respectively the syllable pitch contour, syllable duration, syllable energy, tone, base-syllable type and final type of the nth syllable, and wherein $P(sp_n|p_n,B_{n-1}^{n},t_{n-1}^{n+1})$, $P(sd_n|q_n,s_n,t_n)$ and $P(se_n|r_n,f_n,t_n)$ are respectively the sub-models of the syllable pitch contour, syllable duration and syllable energy of the nth syllable, and wherein $B_{n-1}^{n}=(B_{n-1},B_n)$, and wherein $t_{n-1}^{n+1}=(t_{n-1},t_n,t_{n+1})$. Each of the three sub-models takes in consideration several affecting factors, and the affecting factors are integrated in an addition way. For example, the sub-model of the pitch contour of the nth syllable is expressed by Equation (6-2):

$$sp_n = sp_n^r + \beta_{t_n} + \beta_{p_n} + \beta_{B_{n-1}t_{n-1}}^{f} + \beta_{B_n t_n+1}^{b} + \mu_{sp} \quad (6-2)$$

Wherein $sp_n$ is a 4-dimensional vector of orthogonal coefficients of the pitch contour observed in the nth syllable, and wherein $sp_n^r$ is the normalized $sp_n$, and wherein $\beta_{t_n}$ and $\beta_{p_n}$ are respectively the affecting factors (AP) of the tone and the prosodic state, and wherein $\beta_{B_{n-1},t_{n-1}}^{f}$ and $\beta_{B_n,t_n+1}^{b}$ are respectively the forward and backward APs of the juncture, and wherein $\mu_{sp}$ is the global average of the pitch vector. Suppose that $sp_n^r$ is zero-average and a normal distributed. Thus, Equation (6-3) is obtained:

$$P(sp_n|p_n,B_{n-1}^{n},t_{n-1}^{n+1})=N(sp_n;\beta_{t_n}+\beta_{p_n}+\beta_{B_{n-1},t_{n-1}}^{f}+\beta_{B_n,t_n+1}^{b}+\mu_{sp},R_{sp}) \quad (6-3)$$

The sub-model of the syllable duration $P(sd_n|q_n,s_n,t_n)$ and the sub-model of the syllable energy level $P(se_n|r_n,f_n,t_n)$ are also realized in the similar way by $$P(sd_n|q_n,s_n,t_n)=N(sd_n;\gamma_{t_n}+\gamma_{s_n}+\gamma_{q_n}+\mu_{sd},R_{sd}) \quad (6-4)$$

$$P(se_n|r_n,f_n,t_n)=N(se_n;\omega_{t_n}+\omega_{f_n}+\omega_{r_n}+\mu_{se},R_{se}) \quad (6-5)$$

where γ's and ω's represent APs for syllable duration and syllable energy level; $\mu_{sd}$ and $\mu_{se}$ are their global means; $R_{sd}$ and $R_{se}$ are variances of modeling residues.

The syllable juncture prosodic-acoustic model is expressed by Equation (7-1):

$$P(Y, Z | \Upsilon_s, \Lambda_p, \Lambda_l) = P(pd, ed, pj, dl, \quad (7-1)$$
$$df \| \Upsilon_s, \Lambda_p, \Lambda_l) \approx \prod_{n=1}^{N-1} P(pd_n, ed_n, pj_n, dl_n, df_n | \Upsilon_s, B_n, \Lambda_{l,n})$$

wherein $pd_n$ and $ed_n$ are respectively the pause duration of the juncture following syllable n and the energy-dip level of juncture n;

$$pj_n=(sp_{n+1}(1)-\beta_{t_{n+1}}(1))-(sp_n(1)-\beta_{t_n}(1)) \quad (7-2)$$

is the normalized pitch-level jump across juncture n; $sp_n(1)$ is the first dimension of syllable pitch contour $sp_n$; $\beta_{t_n}(1)$ is the first dimension of the tone AP;

$$dl_n=(sd_n-\gamma_{t_n}-\gamma_{s_n})-(sd_{n-1}-\gamma_{t_{n-1}}-\gamma_{s_{n-1}}) \quad (7-3)$$

$$df_n=(sd_n-\gamma_{t_n}\gamma_{s_n})-(sd_{n+1}-\gamma_{t_{n+1}}-\gamma_{s_{n+1}}) \quad (7-4)$$

are two normalized duration lengthening factors before and across juncture n.

In the present invention, $pd_n$ is simulated with a gamma distribution, and the other four models are simulated with normal distributions. For prosodic breaks, the space of $\Lambda_{l,n}$ is too great. Therefore, $\Lambda_{l,n}$ is divided into several types, and the parameters in the gamma distribution and the normal distribution are estimated at the same time.

However, the present invention does not restrict that the prosodic modes must adopt the methods and distribution modes mentioned in the abovementioned embodiments. The method and distribution mode used by the abovementioned four prosodic models can be modified according to practical applications.

Below is described the two-stage operating process of the present invention. Refer to FIG. 2 again. Firstly, the speech recognition device 20 receives a speech signal and uses the acoustic model and bigram language model to recognize the speech signal and then outputs a word lattice. Next, the rescorer 22 receives the word lattice, uses the acoustic model, prosodic break model, prosodic state model, syllable prosodic-acoustic model, syllable juncture prosodic-acoustic model, factored language model and Equation (2) to rescore and rerank word arcs of the word lattice, and then outputs the language tag $\Lambda_l$, prosodic tag $\Lambda_p$ and phonetic segmentation tag $\gamma_s$ corresponding to the speech signal.

Below is described the process that the hierarchical prosodic model 18 generates the abovementioned prosodic break model, prosodic state model, syllable prosodic-acoustic model and syllable juncture prosodic-acoustic model. Refer to FIG. 3 again. Firstly, the parameter extractor 26 extracts and outputs low-level language parameters, high-level language parameters, pitches, syllable durations and energies, according to the speech files of the prosody-unlabeled database 24 and the texts thereof. Next, the joint prosody labeling and modeling processor 32 acquires, from the parameter extractor 26 and Chinese prosody-hierarchy structure provider 28, low-level language parameters, high-level language parameters, pitches, syllable durations, and energies to estimate a prosodic state sequence P and a prosodic break sequence B based on a maximum likelihood criterion. Then, according to a sequential optimization algorithm, the joint prosody labeling and modeling processor 32 trains low-level language parameters, high-level language parameters, the prosodic-acoustic parameter sequence $X_P$, the prosodic state sequence P, and the prosodic break sequence B as the prosodic break model, prosodic state model, syllable prosodic-acoustic model and syllable juncture prosodic-acoustic model and outputs the abovementioned models. Further, the joint prosody labeling and modeling processor 32 automatically labels the prosodic state sequence P and prosodic break sequence B on the speech signal.

After the training of the prosodic break model, prosodic state model, syllable prosodic-acoustic model and syllable juncture prosodic-acoustic model is completed, the relationships of the low-level language parameters, high-level language parameters, prosodic state sequence P, and prosodic break sequence B, syllable prosodic-acoustic parameter X, syllable juncture prosodic-acoustic parameter Y, and syllable juncture difference parameter Z shown in FIG. 5 are established. FIG. 5 shows that the prosodic break sequence B is related to the high-level language parameters to form the prosodic break model expressed by Equation (4), and that the syllable juncture prosodic-acoustic parameter Y and syllable juncture difference parameter Z are related to both the prosodic break sequence B and the high-level language parameters to form the syllable juncture prosodic-acoustic model expressed by Equation (7-1), and that the prosodic state sequence P is related to the prosodic break sequence B to form the prosodic state model expressed by Equation (5), and that the syllable prosodic-acoustic parameter X is related to the prosodic state sequence P, prosodic break sequence B and low-level language parameters to form the syllable prosodic-acoustic model expressed by Equation (6).

Table. 1 shows the results of a speech recognition experiment, wherein the speech recognition device of the embodiment shown in FIG. 2 is used to undertake a speaker-independent speech recognition experiment in multi-speaker speech database. The database has 303 speakers totally. 23 hours of corpus of 274 speakers, who are randomly selected from the 303 speakers (about 90% of the whole speakers), are adopted to train the system. 2.43 hours of corpus of the residual 29 speakers (about 10% of the whole speakers) are used to test the training result. In order to enrich the output of tags, the present invention chooses 19 speakers having longer speech, which totally amounts to about 2 hours of speech, to verify the performance of the trained system. The error rates of the system of the present invention in word error rate (WER), character error rate (CER) and basic-syllable error rate (SER) are respectively 20.7%, 14.4% and 9.6%. The differences of the error rates of a basic system using only a factored language model and the error rates of the system of the present invention are respectively 3.7%, 3.7% and 2.4% in words, characters and basic-syllable. In other words, the error rates of the system of the present invention are relatively lower than the error rates of the basic system respectively by 15.2%, 20.4% and 20% in words, characters and basic-syllable. Therefore, the prevent invention outperforms the basic system.

TABLE 1

|  | WER | CER | SER |
|---|---|---|---|
| Basic System | 24.4 | 18.1 | 12.0 |
| The Present Invention | 20.7 | 14.4 | 9.6 |

Table. 2 shows the results of a POS decoding experiment. The precision, recall and F-measure of the basic system are respectively 93.4%, 76.4% and 84.0%. The precision, recall and F-measure of the present invention are respectively 93.4%, 80.0% and 86.2%. Table. 3 shows the results of a PM decoding experiment. The precision, recall and F-measure of the basic system are respectively 55.2%, 37.8% and 44.8%. The precision, recall and F-measure of the present invention are respectively 61.2%, 53.0% and 56.8%. Table. 4 shows the results of a tone decoding experiment. The precision, recall and F-measure of the basic system are respectively 87.9%, 87.5% and 87.7%. The accuracy, recall rate and F measurement of the present invention are respectively 91.9%, 91.6% and 91.7%.

TABLE 2

|  | Precision | Recall | F-Measure |
|---|---|---|---|
| Basic System | 93.4 | 76.4 | 84.0 |
| The Present Invention | 93.4 | 80.0 | 86.2 |

TABLE 3

|  | Precision | Recall | F-Measure |
|---|---|---|---|
| Basic System | 55.2 | 37.8 | 44.8 |
| The Present Invention | 61.2 | 53.0 | 56.8 |

TABLE 4

|  | Precision | Recall | F-Measure |
|---|---|---|---|
| Basic System | 87.9 | 87.5 | 87.7 |
| The Present Invention | 91.9 | 91.6 | 91.7 |

Figure 7A:
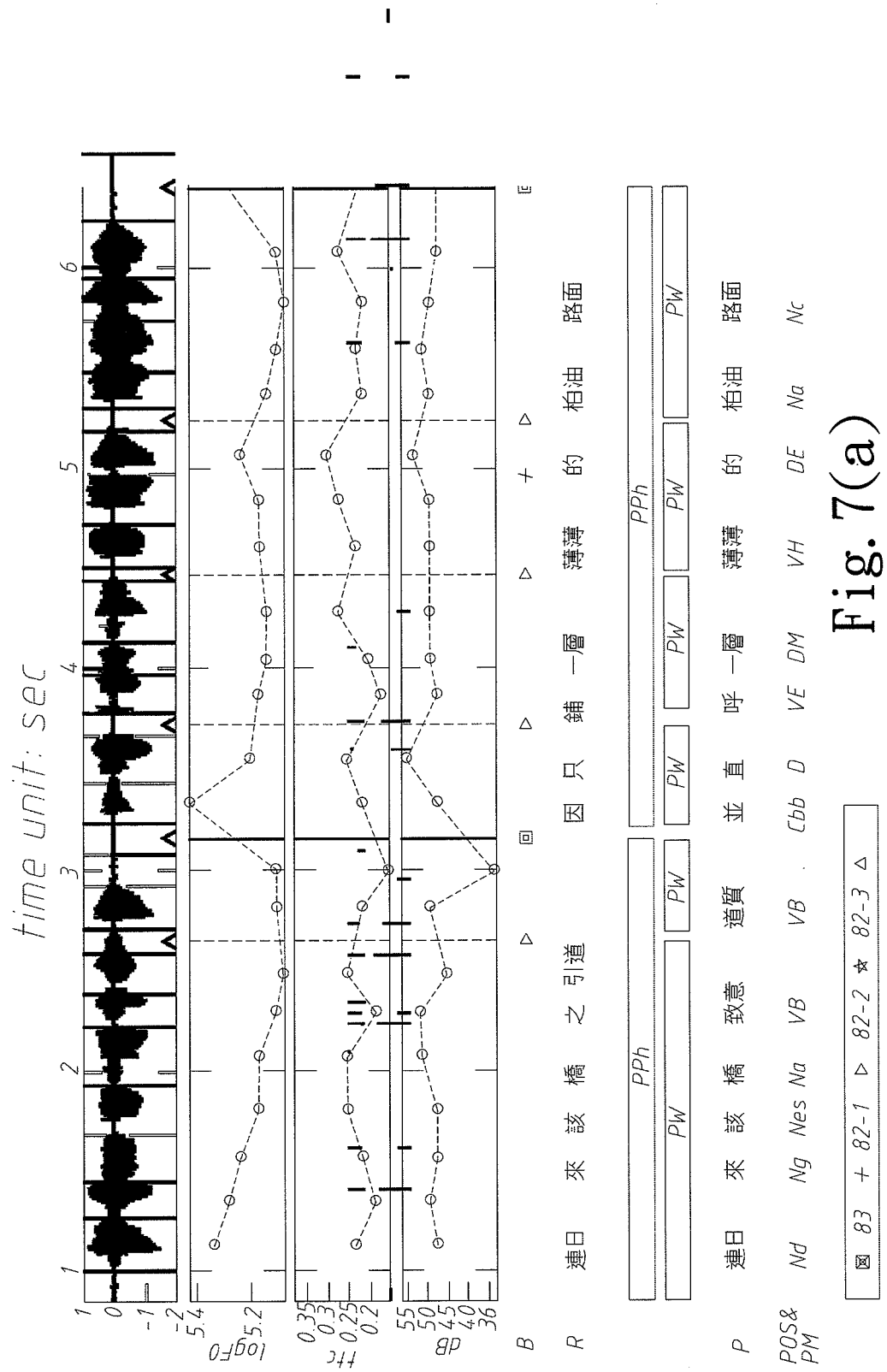
FIG. 7(a) and FIG. 7(b) are diagrams schematically showing an example of the waveform of speech signal and the corresponding tags according to one embodiment of the present invention.
Figure 7B:
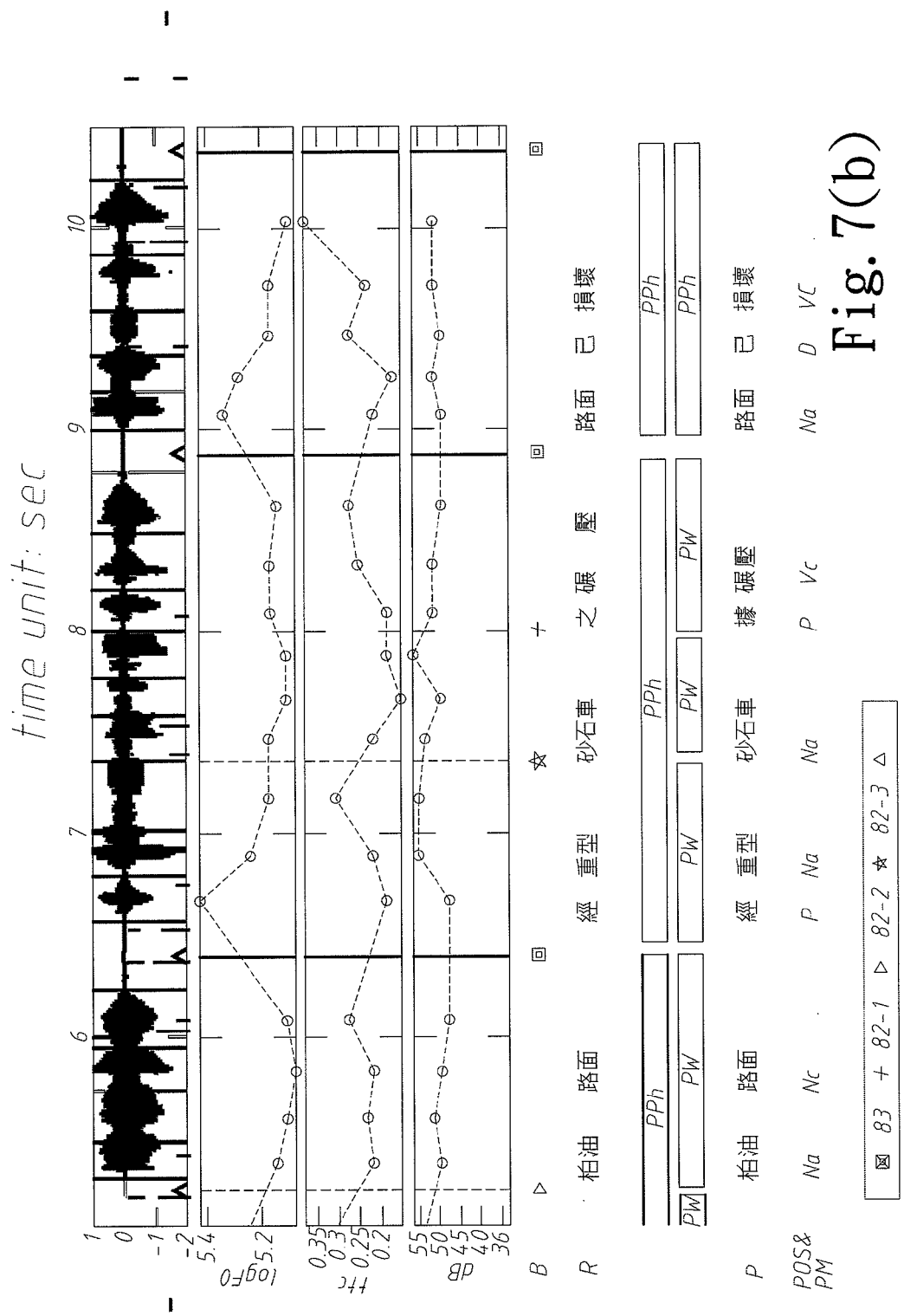

FIG. 7(*a*) and FIG. 7(*b*) show an example of the waveform of speech and the corresponding tags. From top to bottom in FIG. 7 are respectively the waveform of speech, AP sequence of labeled syllable pitch-level prosodic state, AP sequence of labeled syllable duration prosodic state, AP sequence of labeled syllable energy-level prosodic state, prosodic break tags (excluding B0 and B1 for simplicity), correct text of the example speech file, prosodic phrase structure established according to the prosodic break tags, decoded words, decoded phrases, decoded punctuations, and meaning of the decoded punctuations.

The unit of the time axis of the waveform is second. Each triangular symbol denotes a short break. There are four prosodic phrases (PPh) in the waveform. The experiment indeed decodes four PPh's separated by B3's. Prosodic words (PW) are decoded from each prosodic phrase and separated by B2's. It can be observed in the syllable pitch-level prosodic state that pitch-level resets occur at all three B3. It can also be observed in the syllable duration prosodic state that the duration of the former syllable is elongated for B2-3. The tags show that the prosodic breaks and the prosodic states have hierarchical prosodic structures.

In conclusion, the present invention performs rescoring in two stages. Thereby, the present invention not only promotes the correctness of basic speech recognition but also tags the language, prosodies and phonetic segmentations for the succeeding applications.

The embodiments described above are only to exemplify the present invention but not to limit the scope of the present invention, any equivalent modification or variation according to the characteristics or spirit of the present invention is to be also included within the scope of the present invention.

What is claimed is:

1. A Chinese speech recognition system comprising
a language model storage device containing a plurality of language models, including a factored language model;
a hierarchical prosodic model comprising a plurality of prosodic models, including a prosodic break model, a prosodic state model, a syllable prosodic-acoustic model and a syllable-juncture prosodic-acoustic model;
a speech recognition device receiving a speech signal, recognizing said speech signal and outputting a word lattice; and
a rescorer connected with said language model storage device, said hierarchical prosodic model and said speech recognition device, receiving said word lattice, rescoring and reranking word arcs of said word lattice according to said prosodic break model, said prosodic state model, said syllable prosodic-acoustic model and said syllable juncture prosodic-acoustic model, and outputting a language tag, a prosodic tag and a phonetic segmentation tag corresponding to said speech signal.

2. The Chinese speech recognition system according to claim 1, wherein said hierarchical prosodic model further comprises
a prosody-unlabeled database storing a plurality of speech files and a plurality of texts of said speech files;
a parameter extractor connected with said prosody-unlabeled database, extracting and outputting a plurality of low-level language parameters, a plurality of high-level language parameters, a syllable pitch-related prosodic-acoustic parameter, a syllable duration-related prosodic-acoustic parameter, and a syllable energy-related prosodic-acoustic parameter according to said speech files and said texts of said speech files;
a Chinese prosody-hierarchy structure provider providing a plurality of prosodic components and a plurality of prosodic break tags separating said prosodic components; and
a joint prosody labeling and modeling processor connected with said parameter extractor and said Chinese prosody-hierarchy structure provider, acquiring said low-level language parameters, said high-level language parameters, said syllable pitch-related prosodic-acoustic parameter, said syllable duration-related prosodic-acoustic parameter, and said syllable energy-related prosodic-acoustic parameter to estimate a prosodic state sequence P and a prosodic break sequence B, training said low-level language parameters, said high-level language parameters, a prosodic-acoustic parameter sequence $X_P$, said prosodic state sequence P and said prosodic break sequence B as said prosodic break model, said prosodic state model, said syllable prosodic-acoustic model and said syllable juncture prosodic-acoustic model to output them, and automatically tagging said prosodic state sequence P and said prosodic break sequence B on said speech signal.

3. The Chinese speech recognition system according to claim 2, wherein said prosodic components includes syllables, prosodic words, prosodic phrases, and either of a breath group and a prosodic phrase group.

4. The Chinese speech recognition system according to claim 2, wherein said joint prosody labeling and modeling processor estimates said prosodic state sequence P and said prosodic break sequence B according to a maximum likelihood criterion.

5. The Chinese speech recognition system according to claim 2, wherein said joint prosody labeling and modeling processor trains low-level language parameters, said high-level language parameters, said prosodic-acoustic parameter sequence $X_P$, said prosodic state sequence P and said prosodic break sequence B as said prosodic break model, said prosodic state model, said syllable prosodic-acoustic model and said syllable-juncture prosodic-acoustic model according to a sequential optimization algorithm.

6. The Chinese speech recognition system according to claim 2, wherein said factored language model is expressed by an equation:

$$P(W, PM, POS) = \prod_{i=1}^{M} \{P(w_i \mid w_{i-2}^{i-1}) \cdot P(pos_i \mid pos_{i-1}, w_i) \cdot P(pm_{i-1} \mid pos_{i-1}^{i}, w_{i-1})\},$$

and wherein said language tag is expressed by $\Lambda_l=\{W, POS, PM\}$ and said prosodic tag is expressed by $\Lambda_p=\{B, P\}$, and said phonetic segmentation tag is denoted by $\gamma_s$ and wherein $W=\{w_1^M\}=\{w_1 \ldots w_M\}$ is a word sequence, and $POS=\{pos_1^M\}=\{pos_1 \ldots pos_M\}$ a part of speech (POS) sequence associated with W, and $PM=\{pm_1^M\}=\{pm_1 \ldots pm_M\}$ a punctuation marks (PM) sequence, and wherein M is a total quantity of all words of said speech signal, and wherein $B=\{B_1^N\}=\{B_1 \ldots B_N\}$ is said prosodic break sequence and $P=\{p, q, r\}$ with $p=\{p_1^N\}$, $q=\{q_1^N\}$, and $r=\{r_1^N\}$ representing prosodic state sequence for syllable pitch level, duration, and energy level, respectively; N is a total quantity of all syllables of said speech signal, and wherein said prosodic-acoustic parameter sequence $Xp=\{X, Y, Z\}$, and wherein X is a syllable prosodic-acoustic parameter, Y a syllable juncture prosodic-acoustic parameter, and Z a syllable juncture difference parameter, and wherein $w_i$ is an ith said word, $pos_i$ an ith phrase tag, and $pm_i$ an ith punctuation tag.

7. The Chinese speech recognition system according to claim 2, wherein said prosodic break model is expressed by $$P(B \mid \Lambda_l) = \prod_{n=1}^{N-1} P(B_n \mid \Lambda_{l,n}),$$

and wherein said language tag is expressed by $\Lambda_l=\{W, POS, PM\}$ and said prosodic tag is expressed by $\Lambda_p=\{B, P\}$, and said phonetic segmentation tag is denoted by $\gamma_s$ and wherein $W=\{w_1^M\}=\{w_1 \ldots w_M\}$ is a word sequence, and $POS=\{pos_1^M\}=\{pos_1 \ldots pos_M\}$ a part of speech sequence associated with W, and $PM=\{pm_1^M\}=\{pm_1 \ldots pm_M\}$ a punctuation marks sequence, and wherein M is a total quantity of all words of said speech signal, and wherein $B=\{B_1^N\}=\{B_1 \ldots B_N\}$ is said prosodic break sequence and $P=\{p, q, r\}$ with $p=\{p_1^N\}$, $q=\{q_1^N\}$, and $r=\{r_1^N\}$ representing prosodic state sequence for syllable pitch level, duration, and energy level, respectively; and wherein N is a total quantity of all syllables of said speech signal, and wherein said prosodic-acoustic parameter sequence Xp={X, Y, Z}, and wherein X is a syllable prosodic-acoustic parameter, Y a syllable juncture prosodic-acoustic parameter, and Z a syllable-juncture difference parameter, and wherein $\Lambda_{l,n}$ is a contextual linguistic parameter surrounding syllable n.

8. The Chinese speech recognition system according to claim 2, wherein said prosodic state model is expressed by $$P(P|B) = P(p|B)P(q|B)P(r|B) = P(p_1)P(q_1)$$
$$P(r_1)\left[\prod_{n=2}^{N} P(p_n|p_{n-1}, B_{n-1})P(q_n|q_{n-1}, B_{n-1})P(r_n|r_{n-1}, B_{n-1})\right],$$

and wherein said language tag is expressed by $\Lambda_l=\{W, POS, PM\}$ and said prosodic tag is expressed by $\Lambda_p=\{B, P\}$, and said phonetic segmentation tag is denoted by $\gamma_s$, and wherein $W=\{w_1^M\}=\{w_1 \ldots w_M\}$ is a word sequence, and $POS=\{pos_1^M\}=\{pos_1 \ldots pos_M\}$ a part of speech sequence associated with W, and $PM=\{pm_1^M\}=\{pm_1 \ldots pm_M\}$ a punctuation marks sequence, and wherein M is a total quantity of all words of said speech signal, and wherein $B=\{B_1^N\}=\{B_1 \ldots B_N\}$ is said prosodic break sequence and $P=\{p, q, r\}$ with $p=\{p_1^N\}$, $q=\{q_1^N\}$, and $r=\{r_1^N\}$ representing prosodic state sequence for syllable pitch level, duration, and energy level, respectively; N is a total quantity of all syllables of said speech signal, and wherein said prosodic acoustic parameter sequence Xp={X, Y, Z}, and wherein X is a syllable prosodic acoustic parameter, Y a syllable juncture prosodic-acoustic parameter, and Z a syllable juncture difference parameter, and wherein $p_n$, $q_n$ and $r_n$ are respectively said pitch level, said duration level and said energy level of an nth said syllable.

9. The Chinese speech recognition system according to claim 2, wherein said syllable prosodic-acoustic model is expressed by $$P(X | \gamma_S, \Lambda_p, \Lambda_l) =$$
$$P(sp | \gamma_S, B, p, t)P(sd | \gamma_S, B, q, t, s)P(se | \gamma_S, B, r, t, f) =$$
$$\prod_{n=1}^{N} P(sp_n | p_n, B_{n-1}^n, t_{n-1}^{n+1})P(sd_n | q_n, s_n, t_n)P(se_n | r_n, f_n, t_n),$$

and wherein said low-level language parameters include a tone t, a base-syllable s and a final type of syllable f, and wherein said high-level language parameters include a word sequence W, a part of speech sequence POS and a punctuation marks sequence PM, and wherein $sp_n$, $sd_n$, $se_n$, $t_n$, $s_n$, $f_n$ are respectively a pitch contour, a syllable duration, a syllable energy, a tone, a base-syllable type and a final type of an nth syllable.

10. The Chinese speech recognition system according to claim 2, wherein said syllable juncture prosodic-acoustic model is expressed by $$P(Y, Z | \gamma_S, \Lambda_p, \Lambda_l) = P(pd, ed, pj, dl,$$
$$df \| \gamma_S, \Lambda_p, \Lambda_l) = \prod_{n=1}^{N-1} P(pd_n, ed_n, pj_n, dl_n, df_n | \gamma_S, B_n, \Lambda_{l,n}),$$

and wherein said language tag is expressed by $\Lambda_l=\{W, POS, PM\}$ and said prosodic tag is expressed by $\Lambda_p=\{B, P\}$, and said phonetic segmentation tag is denoted by $\gamma_s$, and wherein $W=\{w_1^M\}=\{w_1 \ldots w_M\}$ is a word sequence, and $POS=\{pos_1^M\}=\{pos_1 \ldots pos_M\}$ a part of speech (POS) sequence associated with W, and $PM=\{pm_1^M\}=\{pm_1 \ldots pm_M\}$ a punctuation marks (PM) sequence, and wherein M is a total quantity of all words of said speech signal, and wherein $B=\{B_1^N\}=\{B_1 \ldots B_N\}$ is said prosodic break sequence and $P=\{p, q, r\}$ with $p=\{p_1^N\}$, $q=\{q_1^N\}$, and $r=\{r_1^N\}$ representing prosodic state sequence for syllable pitch level, duration, and energy level, respectively; N is a total quantity of all syllables of said speech signal, and wherein said prosodic acoustic parameter sequence Xp={X, Y, Z}, and wherein X is a syllable prosodic acoustic parameter, Y a syllable-juncture prosodic-acoustic parameter, and Z a syllable juncture difference parameter, and wherein $pd_n$ and $ed_n$ are respectively a pause duration of the juncture following syllable n and the energy-dip level of juncture n, and wherein $pj_n$, is the normalized pitch-level jump across juncture n, and wherein $dl_n$ and $df_n$ are two normalized duration lengthening factors before and across juncture n.

11. The Chinese speech recognition system according to claim 1, wherein said speech recognition device contains an acoustic model and a bigram language model and uses said acoustic model and said bigram language model to recognize said speech signal for outputting said word lattice.

12. The Chinese speech recognition system according to claim 11, wherein said rescorer performs rescoring according to an equation:

$$L(S, \Lambda_a) = \sum_{j=1}^{16} \alpha_j \log p_j,$$

and wherein $S=[p_1 \ldots p_{16}]$ is a 16-dimensional vector formed by these sixteen probabilities, and wherein $P_1$-$P_{16}$ are 16 probability functions derived from said the acoustic model, prosodic break model, said prosodic state model, said syllable prosodic-acoustic model, said syllable juncture prosodic-acoustic model and said factored language model, and wherein $\Lambda_a=[\alpha_1 \ldots \alpha_{16}]$ is a weighting vector determined by a discriminative model combination algorithm.

13. A Chinese speech recognition method comprising steps:
  receiving a speech signal, recognizing said speech signal and outputting a word lattice by a speech recognition device; and
  receiving said word lattice, rescoring word arcs of said word lattice according to a prosodic break model, a prosodic state model, a syllable prosodic acoustic model, a syllable-juncture prosodic-acoustic model and a factored language model stored in a language model storage device, reranking said word arcs, and outputting a language tag, a prosodic tag and a phonetic segmentation tag by a rescorer.

14. The Chinese speech recognition method according to claim 13, wherein said prosodic break model, said prosodic state model and said syllable prosodic-acoustic model, said syllable juncture prosodic-acoustic model are generated according to steps:
  extracting a plurality of low-level language parameters, a plurality of high-level language parameters, syllable pitch-related prosodic-acoustic parameter, a syllable duration-related prosodic-acoustic parameter, and a syllable energy-related prosodic-acoustic parameter according to a plurality of speech files and a plurality of texts of said speech files, and outputting said low-level language parameters, said high-level language parameters, said syllable pitch-related prosodic-acoustic parameter, said syllable duration-related prosodic-acoustic parameter, and said syllable energy-related prosodic-acoustic parameter by a hierarchical prosodic model;

acquiring said low-level language parameters, said high-level language parameters, said syllable pitch-related prosodic-acoustic parameter, said syllable duration-related prosodic-acoustic parameter, and said syllable energy-related prosodic-acoustic parameter to estimate, a prosodic state sequence P, and a prosodic break sequence B by the hierarchical prosodic model; and training a prosodic acoustic parameter sequence $X_P$, said prosodic state sequence P, and said prosodic break sequence B as said prosodic break model, said prosodic state model, said syllable prosodic-acoustic model and said syllable juncture prosodic-acoustic model, outputting said prosodic break model, said prosodic state model, said syllable prosodic-acoustic model and said syllable juncture prosodic-acoustic model, and automatically tagging said prosodic state sequence P and said prosodic break sequence B on said speech signal by the hierarchical prosodic model.

15. The Chinese speech recognition method according to claim 14, wherein said prosodic components includes syllables, prosodic words, prosodic phrases, and either of a breath group and a prosodic phrase group.

16. The Chinese speech recognition method according to claim 14, wherein said prosodic state sequence P and said prosodic break sequence B are estimated according to a maximum likelihood criterion.

17. The Chinese speech recognition method according to claim 14, wherein said prosodic acoustic parameter sequence $X_P$, said prosodic state sequence P and said prosodic break sequence B are trained as said prosodic break model, said prosodic state model, said syllable prosodic-acoustic model and said syllable juncture prosodic-acoustic model according to a sequential optimization algorithm.

18. The Chinese speech recognition method according to claim 14, wherein said factored language model is expressed by an equation:

$$P(W, PM, POS) = \prod_{i=1}^{M} \{P(w_i | w_{i-2}^{j-1}) \cdot P(pos_i | pos_{i-1}, w_i) \cdot P(pm_{i-1} | pos_{i-1}^{j}, w_{i-1})\},$$

and wherein said language tag is expressed by $\Lambda_l=\{W, POS, PM\}$ and said prosodic tag is expressed by $\Lambda_p=\{B, P\}$, and said phonetic segmentation tag is denoted by $\gamma_s$ and wherein $W=\{w_1^M\}=\{w_1 \ldots w_M\}$ is a word sequence, and $POS=\{pos_1^M\}=\{pos_1 \ldots pos_M\}$ a part of speech (POS) sequence associated with W, and $PM=\{pm_1^M\}=\{pm_1 \ldots pm_M\}$ a punctuation marks (PM) sequence, and wherein M is a total quantity of all words of said speech signal, and wherein $B=\{B_1^N\}=\{B_1 \ldots B_N\}$ is said prosodic break sequence and $P=\{p, q, r\}$ with $p=\{p_1^N\}$, $q=\{q_1^N\}$, and $r=\{r_1^N\}$ representing prosodic state sequence for syllable pitch level, duration, and energy level, respectively; N is a total quantity of all syllables of said speech signal, and wherein said prosodic-acoustic parameter sequence $Xp=\{X, Y, Z\}$, and wherein X is a syllable prosodic-acoustic parameter, Y a syllable juncture prosodic-acoustic parameter, and Z a syllable juncture difference parameter, and wherein $w_i$ is an ith said word, $pos_i$ an ith phrase tag, and $pm_i$ an ith punctuation tag.

19. The Chinese speech recognition method according to claim 14, $$P(B | \Lambda_l) = \prod_{n=1}^{N-1} P(B_n | \Lambda_{l,n}),$$

wherein said prosodic break model is expressed by and wherein said language tag is expressed by $\Lambda_l=\{W, POS, PM\}$ and said prosodic tag is expressed by $\Lambda_p\{B, P\}$, and said phonetic segmentation tag is denoted by $\gamma_s$, and wherein $W=\{w_1^M\}=\{w_1 \ldots w_M\}$ is a word sequence, and $POS=\{pos_1^M\}=\{pos_1 \ldots pos_M\}$ a part of speech sequence associated with W, and $PM=\{pm_1^M\}=\{pm_1 \ldots pm_M\}$ a punctuation marks sequence, and wherein M is a total quantity of all words of said speech signal, and wherein $B=\{B_1^N\}=\{B_1 \ldots B_N\}$ is said prosodic break sequence and $P=\{p_1^N\}$, $q=\{q_1^N\}$, and $r=\{r_1^N\}$ representing prosodic state sequence for syllable pitch level, duration, and energy level, respectively; and wherein N is a total quantity of all syllables of said speech signal, and wherein said prosodic-acoustic parameter sequence $Xp=\{X, Y, Z\}$, and wherein X is a syllable prosodic-acoustic parameter, Y a syllable juncture prosodic-acoustic parameter, and Z a syllable-juncture difference parameter, and wherein $\Lambda_{l,n}$ is a contextual linguistic parameter surrounding syllable n.

20. The Chinese speech recognition method according to claim 14, wherein said prosodic state model is expressed by $$P(P | B) = P(p | B)P(q | B)P(r | B) = P(p_1)P(q_1)$$
$$P(r_1)\left[\prod_{n=2}^{N} P(p_n | p_{n-1}, B_{n-1})P(q_n | q_{n-1}, B_{n-1})P(r_n | r_{n-1}, B_{n-1})\right],$$

and wherein said language tag is expressed by $\Lambda_l=\{W, POS, PM\}$ and said prosodic tag is expressed by $\Lambda_p=\{B, P\}$, and said phonetic segmentation tag is denoted by $\gamma_s$, and wherein $W=\{w_1^M\}=\{w_1 \ldots w_M\}$ is a word sequence, and $POS=\{pos_1^M\}=\{pos_1 \ldots pos_M\}$ a part of speech sequence associated with W, and $PM=\{pm_1^M\}=\{pm_1 \ldots pm_M\}$ a punctuation marks sequence, and wherein M is a total quantity of all words of said speech signal, and wherein $B=\{B_1^N\}=\{B_1 \ldots B_N\}$ is said prosodic break sequence and $P=\{p, q, r\}$ with $p=\{p_1^N\}$, $q=\{q_1^N\}$, and $r=\{r_1^N\}$ representing prosodic state sequence for syllable pitch level, duration, and energy level, respectively; N is a total quantity of all syllables of said speech signal, and wherein said prosodic acoustic parameter sequence $Xp=\{X, Y, Z\}$, and wherein X is a syllable prosodic acoustic parameter, Y a syllable juncture prosodic-acoustic parameter, and Z a syllable juncture difference parameter, and wherein $p_n$, $q_n$ and $r_n$ are respectively said pitch level, said duration level and said energy level of an nth said syllable.

21. The Chinese speech recognition method according to claim 14, wherein said syllable prosodic-acoustic model is expressed by $$P(X | \gamma_S, \Lambda_p, \Lambda_l) =$$
$$P(sp | \gamma_S, B, p, t)P(sd | \gamma_S, B, q, t, s)P(se | \gamma_S, B, r, t, f) =$$
$$\prod_{n=1}^{N} P(sp_n | p_n, B_{n-1}^n, t_{n-1}^{n+1})P(sd_n | q_n, s_n, t_n)P(se_n | r_n, f_n, t_n),$$

and wherein said low-level language parameters include a tone t, a base-syllable s and a final type of syllable f, and wherein said high-level language parameters include a word sequence W, a part of speech sequence POS and a punctuation marks sequence PM, and wherein $sp_n$, $sd_n$, $se_n$, $t_n$, $s_n$, $f_n$ are respectively a pitch contour, a syllable duration, a syllable energy, a tone, a base-syllable type and a final type of an nth syllable.

22. The Chinese speech recognition method according to claim 14, wherein said syllable juncture prosodic-acoustic model is expressed by $$P(Y, Z | \gamma_S, \Lambda_p, \Lambda_l) = P(pd, ed, pj, dl,$$

$$df \| \gamma_S, \Lambda_p, \Lambda_l) = \prod_{n=1}^{N-1} P(pd_n, ed_n, pj_n, dl_n, df_n | \gamma_S, B_n, \Lambda_{l,n}),$$

and wherein said language tag is expressed by $\Lambda_l=\{W, POS, PM\}$ and said prosodic tag is expressed by $\Lambda_p=\{B, P\}$, and said phonetic segmentation tag is denoted by YS, and wherein $W=\{w_1^M\}=\{w_1 \ldots w_M\}$ is a word sequence, and $POS=\{pos_1^M\}=\{pos_1 \ldots pos_M\}$ a part of speech (POS) sequence associated with W, and $PM=\{pm_1^M\}=\{pm_1 \ldots pm_M\}$ a punctuation marks (PM) sequence, and wherein M is a total quantity of all words of said speech signal, and wherein $B=\{B_1^N\}=\{B_1 \ldots B_N\}$ is said prosodic break sequence and $P=\{p, q, r\}$ with $p=\{p_1^N\}$, $q=\{q_1^N\}$, and $r=\{r_1^N\}$ representing prosodic state sequence for syllable pitch level, duration, and energy level, respectively; N is a total quantity of all syllables of said speech signal, and wherein said prosodic acoustic parameter sequence $Xp=\{X, Y, Z\}$, and wherein X is a syllable prosodic acoustic parameter, Y a syllable-juncture prosodic-acoustic parameter, and Z a syllable juncture difference parameter, and wherein $pd_n$ and $ed_n$ are respectively a pause duration of the juncture following syllable n and the energy-dip level of juncture n, and wherein $pj_n$ is the normalized pitch-level jump across juncture n, and wherein $dl_n$ and $df_n$ are two normalized duration lengthening factors before and across juncture n.

23. The Chinese speech recognition method according to claim 13, wherein an acoustic model and a bigram language model are used to recognize said speech signal.

24. The Chinese speech recognition method according to claim 23, wherein in said step of rescoring word arcs of said word lattice, an equation is used:

$$L(S, \Lambda_a) = \sum_{j=1}^{16} \alpha_j \log p_j,$$

and wherein $S=[p_1 \ldots p_{16}]$ is a 16-dimensional vector formed by these sixteen probabilities, and wherein $P_1$-$P_{16}$ are 16 probability functions derived from said the acoustic model, prosodic break model, said prosodic state model, said syllable prosodic-acoustic model, said syllable juncture prosodic-acoustic model and said factored language model, and wherein $\Lambda_a=[\alpha_1 \ldots \alpha_{16}]$ is a weighting vector determined by a discriminative model combination algorithm.

* * * * *